United States Patent
Steers

(10) Patent No.: US 12,177,243 B1
(45) Date of Patent: Dec. 24, 2024

(54) SYNCHRONIZATION OF VULNERABILITY CHECKS BETWEEN SECURITY CONSOLE AND DISTRIBUTED ENGINES

(71) Applicant: Rapid7, Inc., Boston, MA (US)

(72) Inventor: Jack Steers, Belfast (GB)

(73) Assignee: Rapid7, Inc., Boston, MA (US)

( * ) Notice: Subject to any disclaimer, the term of this patent is extended or adjusted under 35 U.S.C. 154(b) by 623 days.

(21) Appl. No.: 17/467,484

(22) Filed: Sep. 7, 2021

(51) Int. Cl.
H04L 9/40 (2022.01)

(52) U.S. Cl.
CPC ........ *H04L 63/1433* (2013.01); *H04L 63/205* (2013.01)

(58) Field of Classification Search
CPC ............................ H04L 63/1433; G06F 21/577
See application file for complete search history.

(56) References Cited

U.S. PATENT DOCUMENTS

| | | | | |
|---|---|---|---|---|
| 6,799,197 B1* | 9/2004 | Shetty | ..................... | G06Q 10/10 709/227 |
| 6,944,775 B2* | 9/2005 | Barton | ................... | G06F 21/562 713/188 |
| 6,947,986 B1* | 9/2005 | Huang | ................... | H04L 63/168 717/172 |
| 7,849,507 B1* | 12/2010 | Bloch | ................... | H04L 63/168 726/22 |
| 8,201,257 B1* | 6/2012 | Andres | ................. | G06F 21/568 726/25 |
| 8,789,190 B2* | 7/2014 | Russell | ................. | G06F 21/577 726/25 |
| 9,251,351 B2* | 2/2016 | Hugard, IV | .......... | G06F 21/577 |
| 10,284,589 B2* | 5/2019 | Hamdi | ................ | H04L 63/1416 |
| 11,310,262 B1* | 4/2022 | Oliphant | ............. | H04L 63/1416 |
| 11,853,430 B2* | 12/2023 | Bhalla | ..................... | G06F 21/55 |
| 2003/0074581 A1* | 4/2003 | Hursey | ................ | H04W 8/245 726/22 |

(Continued)

OTHER PUBLICATIONS

X. Tian and D. Tang, "A Distributed Vulnerability Scanning on Machine Learning," 2019 6th International Conference on Information Science and Control Engineering (ICISCE), Shanghai, China, 2019, pp. 32-35. (Year: 2019).*

(Continued)

*Primary Examiner* — Kari L Schmidt
(74) *Attorney, Agent, or Firm* — Ashwin Anand; Lei Sun

(57) ABSTRACT

Various embodiments include systems and methods of implementing vulnerability check synchronization. Vulnerability check synchronization may occur between computing resources at multiple different locations including a first location and a second location. Custom vulnerability check information associated with a particular security vulnerability may be received via a security console user interface that is located at the first location. A selection may be received, via the security console user interface, of a particular distributed engine to be utilized to perform a scan of one or more assets based at least in part on the custom vulnerability check information. Responsive to a determination to initiate the scan of the one or more assets, transfer of the custom vulnerability check information to the particular distributed engine via one or more networks may be automatically initiated.

20 Claims, 7 Drawing Sheets

(56) References Cited

U.S. PATENT DOCUMENTS

| | | | |
|---|---|---|---|
| 2004/0049736 A1* | 3/2004 | Al-Azzawe | G06F 8/00 715/239 |
| 2007/0220602 A1* | 9/2007 | Ricks | G06F 21/554 726/22 |
| 2008/0183603 A1* | 7/2008 | Kothari | G06Q 10/06 705/30 |
| 2008/0196104 A1* | 8/2008 | Tuvell | H04W 12/128 726/24 |
| 2011/0231936 A1* | 9/2011 | Williams | G06F 21/577 726/25 |
| 2012/0216190 A1* | 8/2012 | Sivak | G06F 21/562 718/1 |
| 2013/0074188 A1* | 3/2013 | Giakouminakis | G06F 21/577 726/25 |
| 2013/0167238 A1* | 6/2013 | Russell | H04L 63/1433 726/25 |
| 2013/0174246 A1* | 7/2013 | Schrecker | H04L 63/1433 726/14 |
| 2013/0247207 A1* | 9/2013 | Hugard, IV | G06F 21/57 726/25 |
| 2013/0276053 A1* | 10/2013 | Hugard, IV | H04L 63/104 726/1 |
| 2015/0099562 A1* | 4/2015 | Xiong | H04W 12/04 455/558 |
| 2015/0106939 A1* | 4/2015 | Lietz | H04L 63/1433 726/25 |
| 2016/0164883 A1* | 6/2016 | Li | H04W 8/205 726/7 |
| 2017/0286689 A1* | 10/2017 | Kelley | G06F 21/577 |
| 2018/0124092 A1* | 5/2018 | Pope | H04L 63/20 |
| 2018/0307840 A1* | 10/2018 | David | H04L 63/1441 |
| 2018/0332069 A1* | 11/2018 | Moore | G06F 21/105 |
| 2019/0052994 A1* | 2/2019 | Dar | H04L 65/1016 |
| 2020/0082094 A1* | 3/2020 | Mcallister | G06F 8/77 |
| 2020/0302058 A1* | 9/2020 | Kenyon | G06F 21/554 |
| 2021/0099478 A1* | 4/2021 | Seetharamaiah | H04L 63/14 |
| 2021/0173935 A1* | 6/2021 | Ramasamy | G06F 21/577 |
| 2021/0326451 A1* | 10/2021 | Nunez Di Croce | H04L 63/1433 |
| 2021/0400074 A1* | 12/2021 | Smith | H04L 63/1408 |
| 2022/0269790 A1* | 8/2022 | Rajana | G06F 21/577 |
| 2022/0294817 A1* | 9/2022 | Parekh | H04L 67/10 |
| 2024/0146763 A1* | 5/2024 | Curran | H04L 63/1466 |

OTHER PUBLICATIONS

T. J. Shivani, H. Ramakrishna and N. Nagashree, "Vulnerability Management using Machine Learning Techniques, " 2021 IEEE International Conference on Mobile Networks and Wireless Communications (ICMNWC), Tumkur, Karnataka, India, 2021, pp. 1-4. (Year: 2021).*

* cited by examiner

SYNCHRONIZATION OF VULNERABILITY CHECKS BETWEEN SECURITY CONSOLE AND DISTRIBUTED ENGINES

BACKGROUND

Many companies operate private computer networks that are connected to public networks such as the Internet. While such connections allow its users to easily access resources on the public networks, they also expose the company network to potential cyberattacks. For example, company users may unwittingly download malicious content (e.g., data, files, applications, programs, etc.) onto the company network from the Internet. As another example, interactions between company users and outsiders on the public network may result in leaks of proprietary information to allow malicious actors to gain unauthorized access to the company network. Different types of cyberattacks can be used to achieve a variety of different ends, for example, to obtain sensitive information, gain control of the company's computing systems, or damage the company's resources. As a result, enterprise security management systems have become increasingly important to protect private company networks against these types of vulnerabilities. In some cases, a customer may desire to create and deploy customer-created security vulnerability checks (e.g., for zero-day vulnerabilities, etc.). In some cases, the customer's environment may include multiple distributed engines, and deploying such custom vulnerability checks may be a cumbersome and time-consuming process.

SUMMARY OF EMBODIMENTS

The systems and methods described herein may be employed in various combinations and in embodiments to implement synchronization of vulnerability checks between distributed engines. In the present disclosure, a user may create customer-provided (custom) vulnerability checks that may be loaded into a local security console for automatic transfer to one or more instances of standalone engines at one or more remote locations. The systems and methods of the present disclosure may provide an improved customer experience, including increased efficiency and reliability by allowing a customer to avoid the cumbersome and time-consuming process of managing and transferring such custom vulnerability checks on their own.

Figure 1:
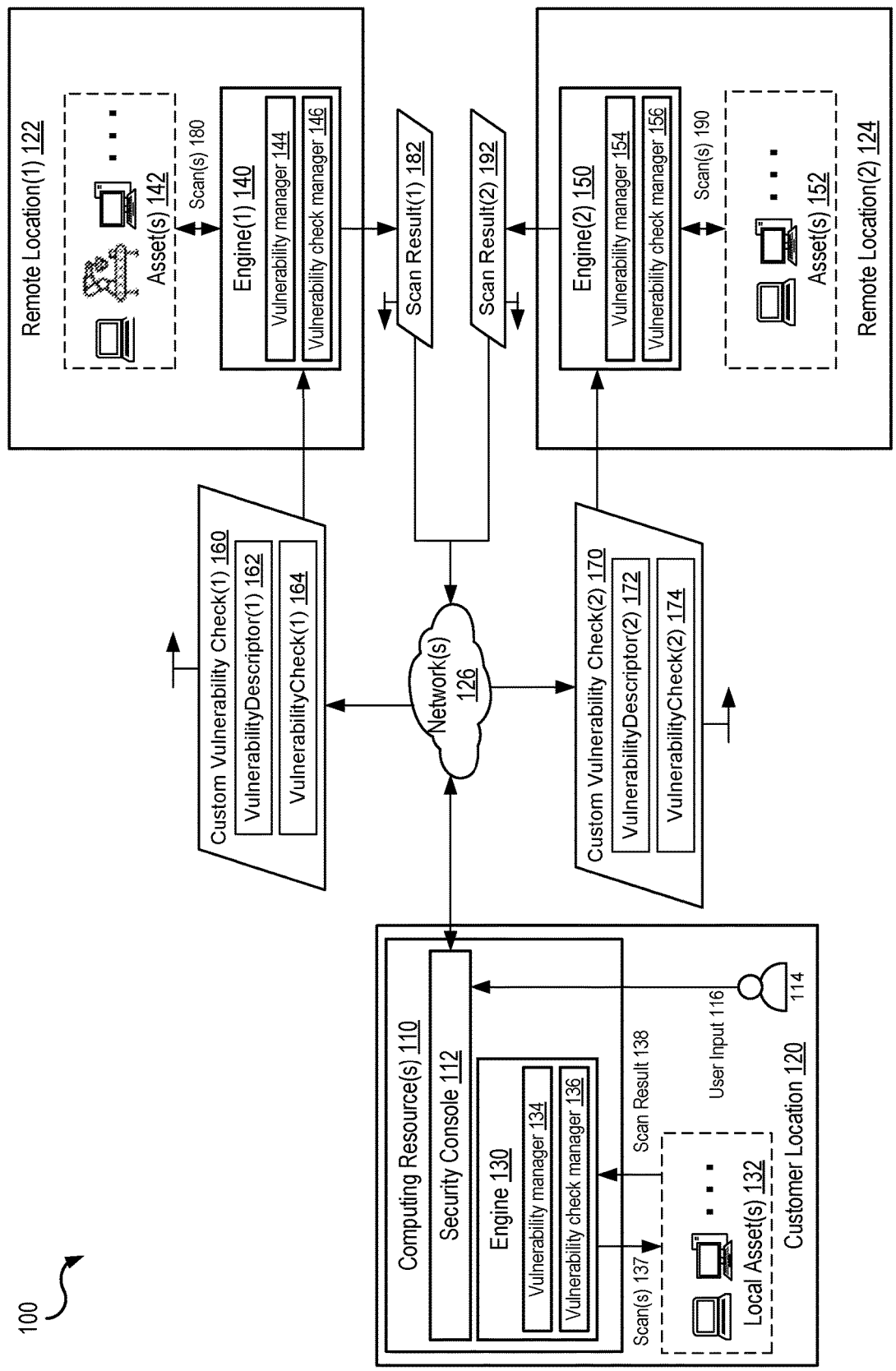
FIG. 1 is a block diagram illustrating an example system that implements synchronization of vulnerability checks between distributed engines, in accordance with some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The present disclosure relates to synchronization of security vulnerability checks between an on-premises security console of a particular customer and one or more distributed scan engines utilized by the particular customer. In the present disclosure, a user may create customer-provided (custom) vulnerability checks that may be loaded into a local security console for automatic transfer to one or more instances of standalone engines at one or more remote locations. Typically, when working with a standalone engine at a remote location from the local security console, the user may engage in a cumbersome and time-consuming process of managing and transferring such custom vulnerability checks. As further described herein, the systems and methods of the present disclosure provide the ability to automatically handle the transfer and loading of custom vulnerability checks from the local security console onto a standalone engine of choice for a given scan based on a customer's configuration settings (e.g., a customer-selected engine and one or more customer-enabled vulnerability checks) prior to initiating the scan. Custom vulnerability checks may be transferred from the local security console onto a remote scan engine instance upon initiation of a scan, and the custom vulnerability checks may be automatically loaded into vulnerability management components of the remote scan engine instance to be utilized when performing the scan. Thus, the systems and methods of the present disclosure may provide an improved customer experience, including increased efficiency and reliability by allowing a customer to avoid the cumbersome and time-consuming process of managing and transferring such custom vulnerability checks on their own.

As further described herein (see e.g., FIGS. 2A and 2B), a customer may create at least one custom check file (e.g., one or more files in an XML file format) to define a customer-authored vulnerability check for a particular security vulnerability, and the customer may then load these custom check file(s) into a local security console prior to a scan, for storage within a local filesystem. A user interface presented at the local security console (also referred to herein as a "security console user interface" or simply a "console") may provide site configuration options that allow the customer to identify the customer-authored vulnerability check for use within a scan template and to select a particular scan engine instance associated with a particular remote location that is to be utilized to perform the scan. Upon initiation of the scan by the customer, the local security console may access the local filesystem to retrieve the custom check file(s) associated with the identified custom vulnerability check for transfer to the selected scan engine instance at the remote location. In a particular embodiment, prior to initiating file transfer, the local security console may be configured to determine whether the selected scan engine instance has disabled custom vulnerability checks. As an illustrative example, the selected scan engine instance may correspond to a shared hosted engine instance that is utilized by multiple customers, and custom checks may be inappropriate for various security/business reasons. When custom checks are not disabled for the selected scan engine instance, the local security console may initiate transfer of the custom check file(s) associated with the identified custom vulnerability check from the local filesystem to the selected scan engine instance. The custom check file(s) received by the remote engine host may be moved into the appropriate custom scanner directories of a filesystem at the remote location. The remote engine instance then prepares the scan process, locating and retrieving the custom check file(s) authored by the customer from the custom scanner directories. The custom vulnerability check information is then loaded into the remote engine instance's vulnerability manager and vulnerability check manager components. The scan process begins, and the remote engine instance makes use of the custom vulnerability check information. Upon completion, one or more results of the scan may be communicated from the remote engine instance for presentation to the customer via the local security console.

As used herein, the term "assets" refers to machines and/or virtual machines in a customer environment. As used herein, the terms "console" and "security console" refer to a security console product, which provides an engine instance for the console to use to perform security scanning operations. As used herein, the term "remote engine" refers to a standalone engine instance, which handles the scanning of assets in a customer environment. The console acts as a presentation instance, as a user interface for a customer to view the collected data for the customer environment. That is, there may be multiple engine instances deployed in different areas of a customer's environment (e.g., in different cities, regions, countries, etc.). When the console utilizes these disparate engine instances, the customer may be able to view data collected from their assets throughout their entire company's global network via the user interface. As an example, the customer may use the console to run scans on different assets in different locations, with the data aggregated at the console.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, and components have not been described in detail so as not to unnecessarily obscure aspects of the embodiments.

Referring to FIG. 1, a block diagram illustrates various components of an example system 100 that implements synchronization of vulnerability checks between distributed engines, in accordance with some embodiments. FIG. 1 illustrates an example of a customer environment that includes a security console 112 that is located on-premises at a customer location 120 as well as multiple instances of engines at different locations in the customer environment that may be utilized to perform various security vulnerability scans. As described further herein, a user 114 (also referred to herein as a "customer") at the customer location 120 may create customer-provided (custom) vulnerability checks that may be loaded into the security console 112 for automatic transfer to one or more instances of standalone engines at one or more remote locations.

In the particular embodiment depicted in FIG. 1, the customer environment includes the customer location 120, a first remote location 122, and a second remote location 124, which may be communicatively coupled via one or more networks 126 (e.g., the Internet). FIG. 1 illustrates that an engine 130 at the customer location 120 provides an engine instance for the security console 112 to use to perform vulnerability scanning operations on assets in the customer environment (e.g., including but not limited to one or more local assets 132 at the customer location 120). FIG. 1 further illustrates that a first engine 140 at the first remote location 122 represents a first standalone engine instance, which may be configured to perform vulnerability scanning operations on a first set of assets 142 at the first remote location 122. FIG. 1 further illustrates that a second engine 150 at the second remote location 124 represents a second standalone engine instance, which may be configured to perform vulnerability scanning operations on a second set of assets 152 at the second remote location 124. It will be appreciated that the example customer environment depicted in FIG. 1 is for illustrative purposes only and that alternative numbers and/or arrangements of locations, engines, or assets may be possible.

Figure 6:
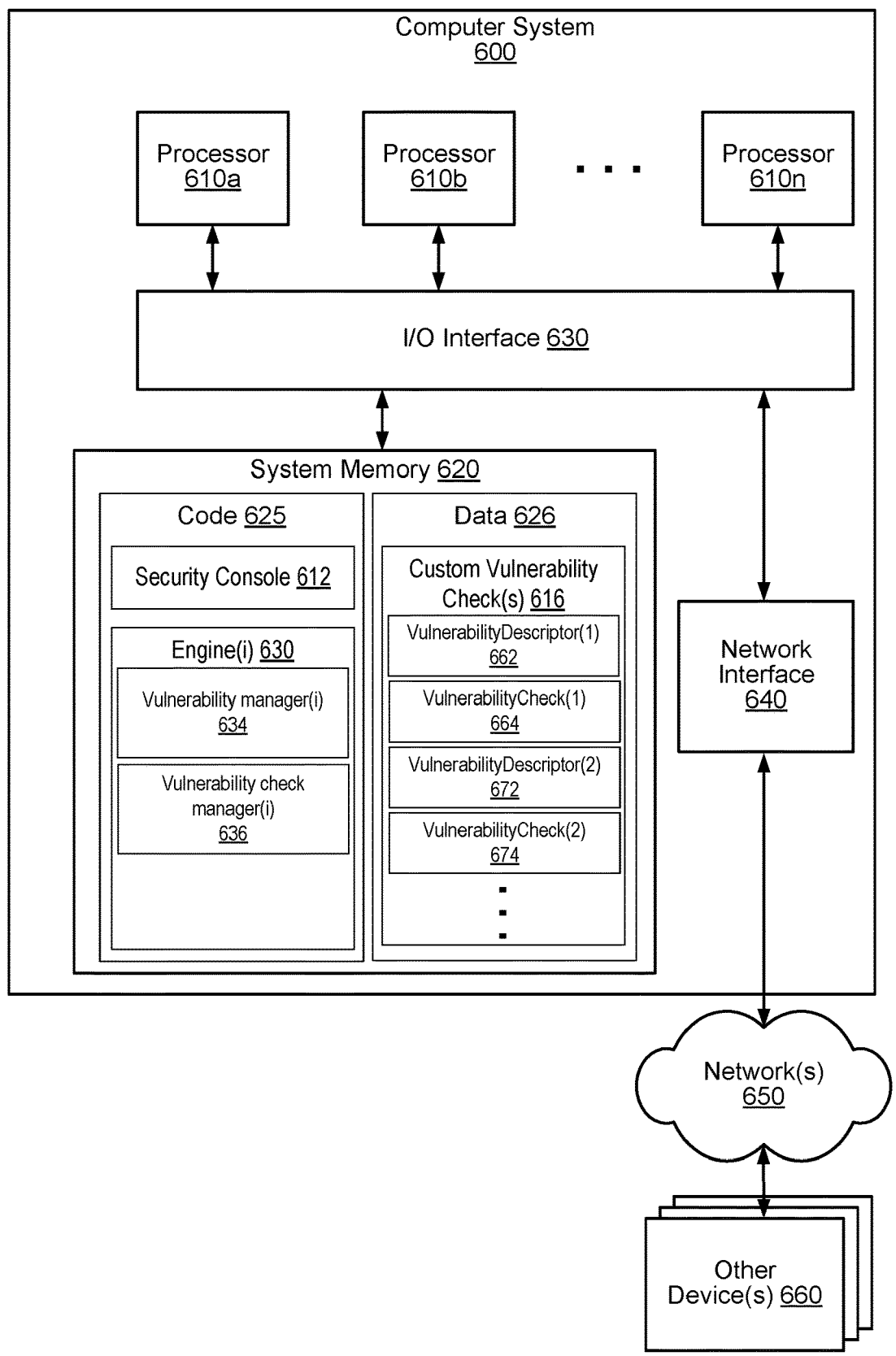
FIG. 6 is a block diagram illustrating an example computer system that may be used to implement one or more portions of a system that implements synchronization of vulnerability checks between distributed engines, according to some embodiments.

FIG. 1 depicts one or more computing resources 110, which may include one or more hardware processors with associated memory (not shown, see e.g. FIG. 6). The computing resource(s) 110 may include one or more components that are configured to implement the synchronization of vulnerability checks between distributed engines, as described herein. In the embodiment depicted in FIG. 1, the computing resource(s) 110 include the engine 130 that provides an engine instance for the security console 112. FIG. 1 illustrates that the engine 130 may have various components, including but not limited to a vulnerability manager 134 and a vulnerability check manager 136. The components of the engine 130 may be configured to perform vulnerability scanning operations on assets in the customer environment. The vulnerability manager 134 and its associated vulnerability check manager 136 correspond to an internal vulnerability framework that is used to interpret vulnerabilities and to define them for customer readability purposes. The vulnerability framework is the means to accept vulnerabilities that are identified, most of which are reported in the National Institute of Standards and Technology (NIST) vulnerability database. As described further herein, in some cases, customers may desire to prioritize vulnerabilities that come out at the moment of release (also known as "zero day vulnerabilities").

In order to accommodate customers that seek to prioritize particular vulnerabilities (e.g., such "zero day vulnerabilities"), the security console 112 may be configured to receive information from the user 114 at the customer location 120, according to some embodiments of the present disclosure. In the embodiment depicted in FIG. 1, the user 114 provides user input 116 via the security console 112. For example, prior to a scan, the user 114 may create a custom vulnerability check, including at least one custom check file (e.g., one or more files in an XML file format) to define a customer-authored vulnerability check for a particular security vulnerability. The user 114 may then load these custom check file(s) into the security console 112 prior to a scan, for storage within a local filesystem (not shown) at the customer location 120. In a particular embodiment, a customer-authored vulnerability check may include at least two types of files, which may each be in an XML file format in some non-limiting embodiments. To illustrate, a first type of file associated with a particular customer-authored vulnerability check is referred to herein as a "vulnerability descriptor" file, and a second type of file associated with the particular customer-authored vulnerability check is referred to herein as a "vulnerability check" file. A "vulnerability descriptor" file is a description of a particular vulnerability; and a "vulnerability check" file is a file that is utilized by a particular scan engine to perform tests on one or more assets inside the customer environment. Using the security console 112, a customer (e.g., the user 114) may be able to see details about a particular vulnerability, and a vulnerability check determines whether the particular vulnerability is associated with a particular asset. To illustrate, such tests could be a check for operating system vulnerabilities (e.g., Windows vulnerabilities, Linux vulnerabilities, etc.) or for different things like software vulnerabilities (e.g., an old version of Java that is vulnerable to particular attacks).

According to some embodiments, a vulnerability descriptor file may be one type of XML file ending in a ".xml" extension, and a vulnerability check file may be another type XML file ending in a ".vck" extension. As described further herein with respect to FIG. 2A, a particular vulnerability descriptor file may contain information about a specific vulnerability. Illustrative, non-limiting examples of such information may include: a title, a description, a severity, a Common Vulnerabilities and Exposure (CVE) identifier, a Common Vulnerability Scoring System (CVSS) score, among others. As described further herein with respect to FIG. 2B, a particular vulnerability check file may contain multiple tests which are compiled at runtime and used by the security console 112 to verify the existence (or non-existence) of the specific vulnerability. In some cases, several different types of checks may be associated with a single vulnerability. In such cases, one vulnerability descriptor file may be associated with the single vulnerability and more than one vulnerability check file (each ending in the ".vck" extension) may be associated with the single vulnerability. According to some embodiments, a particular customer-authored vulnerability check may include a third (optional) type of file. To illustrate, the third (optional) type of file is referred to herein as a "vulnerability solution" file. According to some embodiments, a vulnerability solution file may be a third type of XML file ending in a ".sol" extension which contains vulnerability solution information. This solution information may optionally be included in the vulnerability descriptor file (ending in the ".xml" extension) or may be broken out into a separate XML file (ending in the ".sol" extension) for re-use for other vulnerabilities. Solutions contain information about how to remediate the vulnerability. Utilizing a separate vulnerability solution file allows the solution to be written once and updated in one place when the recommended solution changes for many vulnerabilities that use the same solution.

In the example depicted in FIG. 1, two different custom vulnerability checks are illustrated. A first custom vulnerability check 160 includes at least a first vulnerability descriptor file 162 and a first vulnerability check file 164. While not shown in FIG. 1, in some cases, the first custom vulnerability check 160 may also include additional vulnerability check file(s) and/or a vulnerability solution file (not shown). A second custom vulnerability check 170 includes at least a second vulnerability descriptor file 172 and a second vulnerability check file 174. While not shown in FIG. 1, in some cases, the second custom vulnerability check 170 may also include additional vulnerability check file(s) and/or a vulnerability solution file (not shown).

As an example, after the user 114 has created the custom check files associated with the first custom vulnerability check 160 (i.e., at least the first vulnerability descriptor file 162 and the first vulnerability check file 164), the user input 116 provided by the user 114 may correspond to a first "load content" command to load these custom check files into the security console 112 prior to initiating a scan. Responsive to receiving this first "load content" command, the security console 112 may be configured to store the custom check files associated with the first custom vulnerability check 160 (i.e., at least the first vulnerability descriptor file 162 and the first vulnerability check file 164) within the local filesystem (not shown) at the customer location 120. As another example, after the user 114 has created the custom check files associated with the second custom vulnerability check 170 (i.e., at least the second vulnerability descriptor file 172 and the second vulnerability check file 174), the user input 116 provided by the user 114 may correspond to a second "load content" command to load these custom check files into the security console 112 prior to initiating a scan. Responsive to receiving this second "load content" command, the security console 112 may be configured to store the custom check files associated with the second custom vulnerability check 170 (i.e., at least the second vulnerability descriptor file 172 and the second vulnerability check file 174) within the local filesystem (not shown) at the customer location 120.

Within a Site Configuration (not shown) interface generated at the security console 112, the user 114 may then enable a particular custom vulnerability check that is to be used for a scan within a Scan Template (not shown) and may select a particular standalone scan engine to use for the scan. As one example, for the first custom vulnerability check 160, the user input 116 provided by the user 114 may include enabling the first custom vulnerability check 160 to be used for one or more scans 180 at the first remote location 122 and selecting the first engine 140 as the particular standalone engine to be used for the scan(s) 180. Subsequently, the user input 116 provided by the user 114 may correspond to an "initiate scan" command provided to the security console 112. Responsive to receiving the "initiate scan" command, the security console 112 may initiate transfer of the custom check files associated with the first custom vulnerability check 160 (i.e., at least the first vulnerability descriptor file 162 and the first vulnerability check file 164) to the first remote location 122 via the network(s) 126.

The custom check files associated with the first custom vulnerability check 160 (i.e., at least the first vulnerability descriptor file 162 and the first vulnerability check file 164) received at the first engine 140 may be moved into the relative custom scanner directories in filesystem at the first remote location 122. For example, the first engine 140 may move the custom check files associated with the first custom vulnerability check 160 into appropriate directories accessible to the vulnerability manager 144 and the vulnerability check manager 146 components that are utilized to perform vulnerability scanning operation(s).

The first engine 140 then prepares the scan process, including locating the custom check files associated with the first custom vulnerability check 160 (i.e., at least the first vulnerability descriptor file 162 and the first vulnerability check file 164). Subsequently, the custom check files associated with the first custom vulnerability check 160 (i.e., at least the first vulnerability descriptor file 162 and the first vulnerability check file 164) are loaded into the vulnerability manager 144 and the vulnerability check manager 146 components of the first engine 140. Afterwards, the scan process starts, with the first engine 140 making use of the first custom vulnerability check 160 to perform the scan(s) 180 of at least one asset of the first set of assets 142 at the first remote location 122.

After performing the scan(s) 180, the first engine 140 may send a first scan result 182 to the security console 112 via the network(s) 126 for presentation to the user 114 via a user interface (not shown) of the security console 112.

As another example, for the second custom vulnerability check 170, the user input 116 provided by the user 114 may include enabling the second custom vulnerability check 170 to be used for one or more scans 190 at the second remote location 124 and selecting the second engine 150 as the particular standalone engine to be used for the scan(s) 190. Subsequently, the user input 116 provided by the user 114 may correspond to an "initiate scan" command provided to the security console 112. Responsive to receiving the "initiate scan" command, the security console 112 may initiate transfer of the custom check files associated with the second custom vulnerability check 170 (i.e., at least the second vulnerability descriptor file 172 and the second vulnerability check file 174) to the second remote location 124 via the network(s) 126.

The custom check files associated with the second custom vulnerability check 170 (i.e., at least the second vulnerability descriptor file 172 and the second vulnerability check file 174) received at the second engine 150 may be moved into the relative custom scanner directories in filesystem at the second remote location 124. For example, the second engine 150 may move the custom check files associated with the second custom vulnerability check 170 into appropriate directories accessible to the vulnerability manager 154 and the vulnerability check manager 156 components that are utilized to perform vulnerability scanning operation(s).

The second engine 150 then prepares the scan process, including locating the custom check files associated with the second custom vulnerability check 170 (i.e., at least the second vulnerability descriptor file 172 and the second vulnerability check file 174). Subsequently, the custom check files associated with the second custom vulnerability check 170 (i.e., at least the second vulnerability descriptor file 172 and the second vulnerability check file 174) are loaded into the vulnerability manager 154 and the vulnerability check manager 156 components of the second engine 150. Afterwards, the scan process starts, with the second engine 150 making use of the second custom vulnerability check 170 to perform the scan(s) 190 of at least one asset of the second set of assets 152 at the second remote location 124.

After performing the scan(s) 190, the second engine 150 may send a second scan result 192 to the security console 112 via the network(s) 126 for presentation to the user 114 via a user interface (not shown) of the security console 112.

Thus, FIG. 1 illustrates an example system that implements synchronization of vulnerability checks between distributed engines. FIG. 1 illustrates that the security console 112 is configured to enable the user 114 to load customer-created vulnerability checks (e.g., the first and second custom vulnerability checks 160, 170) into the security console 112 at the customer location 120, and the security console 112 may be configured to automatically transfer custom check file(s) to one or more instances of standalone engines at one or more remote locations. Accordingly, the example system depicted in FIG. 1 may provide an improved customer experience, including increased efficiency and reliability by allowing a customer to avoid the cumbersome and time-consuming process of managing and transferring such custom vulnerability checks on their own.

Figure 2A:
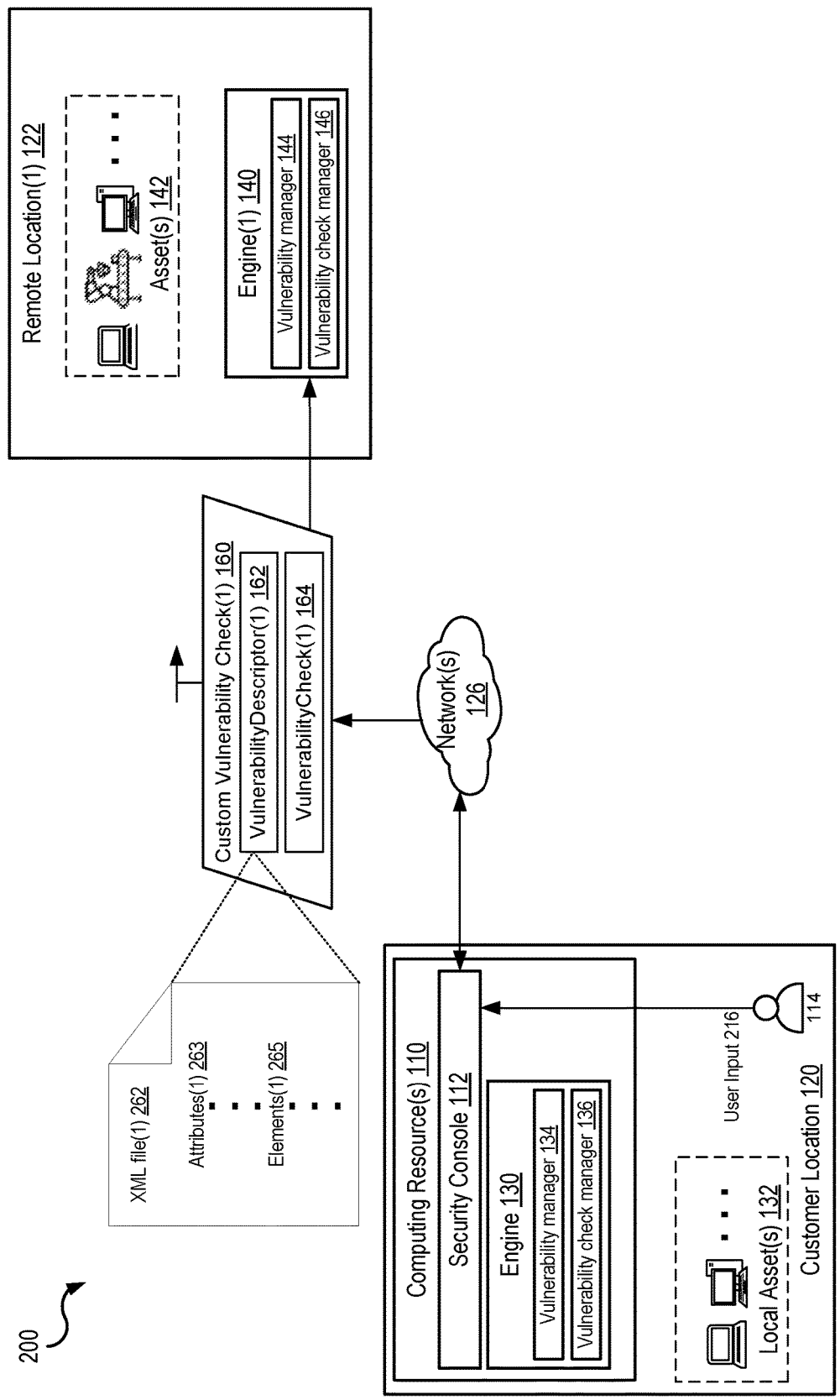
FIGS. 2A and 2B are block diagrams illustrating examples of files associated with a custom vulnerability check, in accordance with some embodiments.
Figure 2B:
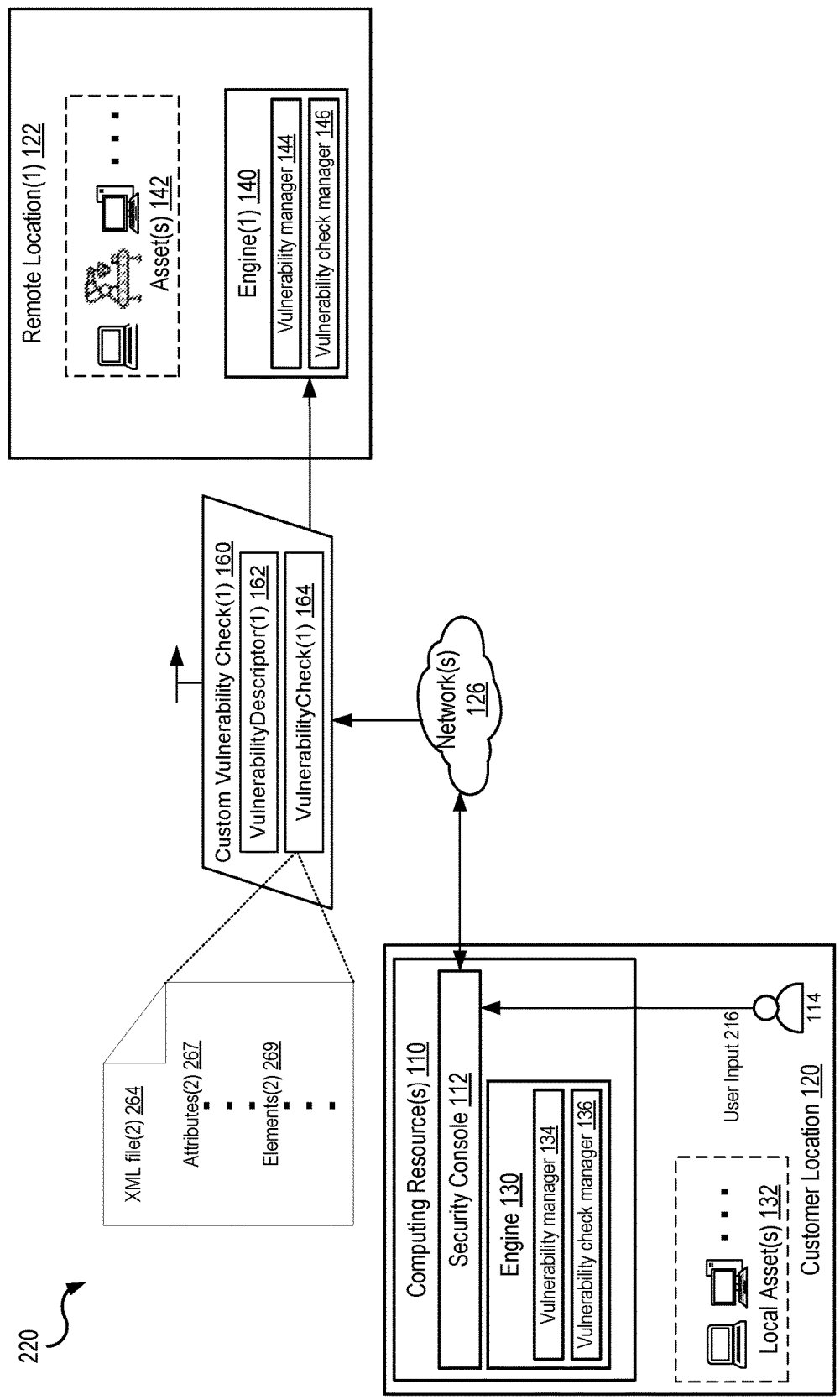

FIGS. 2A and 2B are block diagrams 200, 220 illustrating examples of files associated with a custom vulnerability check, in accordance with some embodiments. FIG. 2A includes details of an example "vulnerability descriptor" file (e.g., the first vulnerability descriptor file 162 of FIG. 1) which is a description of a particular vulnerability, according to some embodiments. FIG. 2B includes details of an example "vulnerability check" file (e.g., the first vulnerability check file 164 of FIG. 1) which is a file that is utilized by a particular scan engine use to perform tests on one or more assets inside the customer environment, according to some embodiments.

Referring to FIG. 2A, a block diagram 200 illustrates that a particular vulnerability descriptor file associated with a particular custom vulnerability check may correspond to a first XML file 262. According to some embodiments, the first XML file 262 may be one type of XML file ending in a ".xml" extension. In the example depicted in FIG. 2A, the first XML file 262 may correspond to the first vulnerability descriptor file 162 associated with the first custom vulnerability check 160 depicted in FIG. 1. FIG. 2A illustrates that a particular vulnerability descriptor file may contain information about a specific vulnerability.

The first XML file 262 may be a file with a name (e.g., "vulnerability_name" as a generic example) that identifies a particular custom vulnerability that precedes the .xml extension. To illustrate, for a generic name of "vulnerability_name", the first XML file 262 may be named vulnerability_name.xml. In the example depicted in FIG. 2A, the first XML file 262 includes a first set of attributes 263 and a first set of elements 265.

The first set of attributes 263 may include at least some of the following attributes: an id attribute; a version attribute; an added attribute; a modified attribute; and a published attribute.

With respect to the id attribute, every vulnerability in the security console 112 has a unique identifier. This identifier distinguishes this vulnerability and is referred to by the corresponding .vck files (described below with respect to FIG. 2B). The name of the first XML file 262 (e.g., "vulnerability_name") must have the same base name as the identifier. The id attribute may contain a unique series of up to 255 alphabetic characters, numbers, or hyphens. With respect to the version attribute, this attribute refers to the version of the vulnerability descriptor file format. This may always be set to 2.0, according to some embodiments. With respect to the added attribute, the descriptor may have an added date, which is used to note when it was first included in the security console 112. This attribute may contain a valid date in the form of YYYY-MM-DD. With respect to the modified attribute, this describes when this particular XML file was last modified. If the user 114 modifies the XML file, the user 114 may update the modified attribute, so that the security console 112 will re-process this file. For the security console 112 to re-import this data into its internal database, the user 114 may change the modified attribute every time that change(s) are made to this file. With respect to the published attribute, vulnerabilities may have a published date which describes the date when information about the vulnerability was first released. This attribute is optional, although it is recommended to include the attribute if the information for the vulnerability is available. This attribute may contain a valid date in the form of YYYY-MM-DD.

The first set of elements 265 may include at least some of the following elements: a name element; a cvss element; a Tags element; an AlternateIDs element; a Description element; and a Solutions element.

With respect to the name element, this element is the title of the vulnerability, as displayed in a vulnerability detail listing in a user interface/reports presented to the user 114 at the security console 112. With respect to the cvss element, this element may store the complete CVSSv2 vector which scores this vulnerability. The security console 112 may automatically compute the CVSS base score from the vector. With respect to the Tags element, tagging is used to categorize the vulnerability for purposes of category searching or customization of scan templates. There may be multiple tag elements, in some cases. With respect to the AlternateIds element, this element is used to group several reference identifiers to the vulnerability descriptor. In some cases, the security console 112 may have the ability to automatically generate a correct hyperlink in a user interface and reports for most types of IDs based on built-in logic. With respect to the Description element, this element may be used to provide useful information on the behavior of the vulnerability which may be displayed in a vulnerability details page in a user interface of the security console 112. This element supports a limited subset of HTML markup, including <a>, <p>, <ul>, <ol>, and <li> so that it can be parsed into an intermediate documentation format, and subsequently transformed into (X) HTML, PDF, RTF, and plain-text formats. With respect to the Solutions element, this element contains a description of how to patch or remediate this vulnerability. The solutions for a vulnerability are grouped under the Solutions element and are either referenced by id (for out-of-file solutions) or constructed in the file itself (inline solutions). The reason for solution IDs is so that a remediation report generated by the security console 112 for the user 114 can automatically identify how to optimize the remediation steps (for example, collapsing multiple vulnerabilities into a single common solution that remediates them all).

Referring to FIG. 2B, a block diagram 220 illustrates that a particular vulnerability check file associated with a particular custom vulnerability check may correspond to a second XML file 264. According to some embodiments, the second XML file 264 may be another type of XML file ending in a ".vck" extension. In the example depicted in FIG. 2B, the second XML file 264 may correspond to the first vulnerability check file 164 associated with the first custom vulnerability check 160 depicted in FIG. 1.

FIG. 2B illustrates that a particular vulnerability check file may contain multiple tests which are compiled at runtime and used by the security console 112 to verify the existence (or non-existence) of the specific vulnerability. To illustrate, such tests could be a check for operating system vulnerabilities (e.g., Windows vulnerabilities, Linux vulnerabilities, etc.) or for different things like software vulnerabilities (e.g., an old version of Java that is vulnerable to particular attacks). In some cases, several different types of checks may be associated with a single vulnerability. In such cases, one vulnerability descriptor file may be associated with the single vulnerability and more than one vulnerability check file (each ending in the ".vck" extension) may be associated with the single vulnerability.

In the example depicted in FIG. 2B, the second XML file 264 includes a second set of attributes 267 and a second set of elements 269

The second set of attributes 267 may include at least some of the following attributes: an id attribute; and a scope attribute. With respect to the id attribute, this attribute refers to the same ID used in the first XML file 262 of FIG. 2A. This may be used by the security console 112 to identify which vulnerability this check is meant for. With respect to the scope attribute, this may be set to endpoint for service-specific vulnerabilities (those affecting a particular port or service) or node for system-wide vulnerabilities (those affecting the entire system). Web vulnerabilities are endpoint-specific by definition, while an exploit of the TCP/IP stack would be for the entire node.

The second set of elements 269 may include at least some of the following elements: a NetworkService element; a HTTPCheck element; an HTTPResponse element; and a regex element.

With respect to the NetworkService element, this instructs the scan engine to run this check against any port found to be running the HTTP or HTTPS protocol. Using the character (also known as the "pipe" character) indicates HTTP or HTTPS. With respect to the HTTPCheck element, this may indicate a basic HTTP "send a request, match the response" type of check. The HTTPCheck element may contain only one HTTPRequest child element and one HTTPResponse element. The HTTPRequest element may contain one or more URI elements. If multiple URI elements are present, each URI may be requested in turn, looking for a match to the HTTPResponse conditions. With respect to the HTTPResponse element, this may indicate to the scan engine to look for a response with a particular HTTP status code whose body matches the given regular expression. With respect to the regex element, this may use Perl 5 syntax, but with some small differences. This is matched against the HTTP response body. To perform case-insensitive matching, the user 114 may specify regex cflags="REG_ICASE". Pattern matching occurs on a line-by-line basis. For the regex to match across multiple lines, the user 114 may specify regex cflags="REG_LINE_ANY_CRLF".

Thus, FIGS. 2A and 2B illustrate examples of custom check files that may be used to define a particular customer-defined vulnerability check. In the examples depicted in FIGS. 2A and 2B, the custom check files include a "vulnerability descriptor" file that is a description of a particular vulnerability and a "vulnerability check" file that is a file that is utilized by a particular scan engine to perform tests on one or more assets inside the customer environment. To illustrate, such tests could be a check for operating system vulnerabilities (e.g., Windows vulnerabilities, Linux vulnerabilities, etc.) or for different things like software vulnerabilities (e.g., an old version of Java that is vulnerable to particular attacks).

Figure 3:
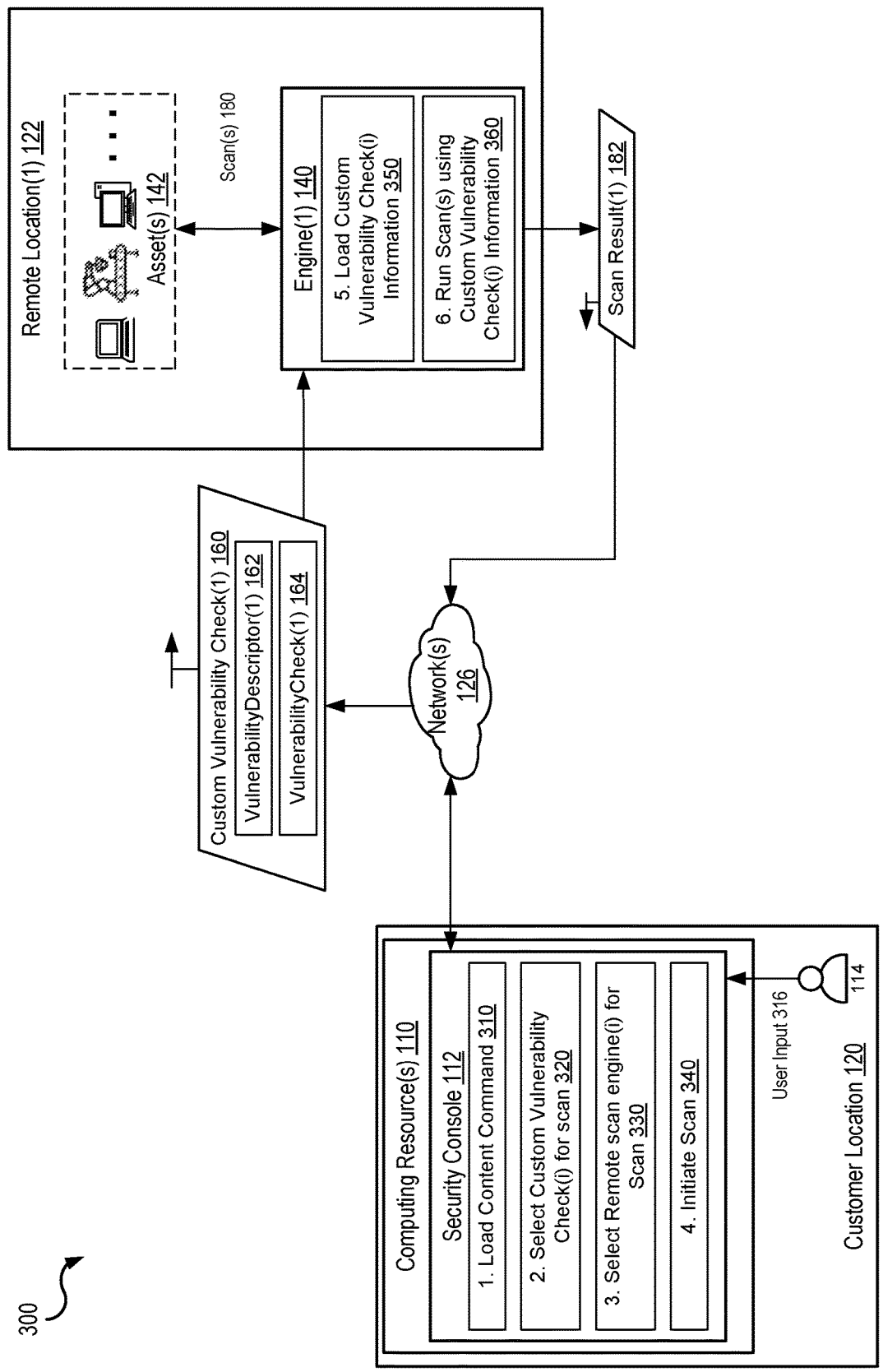
FIG. 3 is a block diagram that illustrates an example process of synchronizing a custom vulnerability check between an on-premises security console and a distributed engine, in accordance with some embodiments.

FIG. 3 is a block diagram 300 that illustrates an example process of synchronizing a custom vulnerability check between an on-premises security console and a distributed engine, in accordance with some embodiments. In the particular embodiment depicted in FIG. 3, the customer vulnerability check corresponds to the first custom vulnerability check 160, as described further herein with respect to FIG. 1 and FIGS. 2A and 2B. Further, in the particular embodiment depicted in FIG. 3, the synchronization process involves utilizing the security console 112 at the customer location 120 and the first engine 140 at the first remote location 122. While not shown in the example of FIG. 3, it will be appreciated that a similar synchronization process may be performed for the second custom vulnerability check 170 depicted in FIG. 1, utilizing the security console 112 at the customer location 120 and the second engine 150 at the second remote location 124.

FIG. 3 illustrates that, in the present disclosure, the security console 112 may be configured such that it has the ability to automatically transfer content to a selected remote engine (e.g., the first engine 140 at the first remote location 122, in this example) in order to avoid the cumbersome and time-consuming process of having a customer manually perform such operations. FIG. 3 illustrates various operations performed by the user 114 utilizing the security console 112 at the customer location 120. In FIG. 3, user input 316 provided by the user 114 may correspond to multiple user inputs associated with each of the individual operations.

To illustrate, a first operation 310 performed at the security console 112 may correspond to a "load content" command received from the user 114 as part of the user input 316. Responsive to receiving this "load content" command, the security console 112 may load the custom check file(s) provided by the user 114 into a local filesystem. As previously described herein, such custom check file(s) include at least the first vulnerability descriptor file 162 and the first vulnerability check file 164 associated with the first custom vulnerability check 160.

While not shown in the example of FIG. 3, it will be appreciated that in alternative embodiments, the first operation 310 performed at the security console 112 may correspond to an alternative "load content" command received from the user 114 (e.g., for the custom check file(s) associated with the second custom vulnerability check 170 depicted in FIG. 1, among other alternatives).

A second operation 320 performed at the security console 112 may correspond to a selection, by the user 114, of a particular customer vulnerability check (identified as "Custom Vulnerability Check (i)" in FIG. 3) to be utilized for a particular scan as part of the user input 316. In the particular embodiment depicted in FIG. 3, the user input 316 may correspond to a selection, by the user 114 of the first custom vulnerability check 160 as previously described herein with respect to FIG. 1 and FIGS. 2A and 2B. Responsive to receiving this selection of the first custom vulnerability check 160, the security console 112 may retrieve the custom check file(s) associated with the first custom vulnerability check 160 from the local filesystem.

While not shown in the example of FIG. 3, it will be appreciated that in alternative embodiments, the second operation 320 performed at the security console 112 may correspond to a selection, by the user 114, of a different custom vulnerability check to be utilized for a scan (e.g., a selection of the second custom vulnerability check 170 depicted in FIG. 1, among other alternatives). Responsive to such an alternative selection, the security console 112 may retrieve the custom check file(s) associated with the second custom vulnerability check 170 from the local filesystem.

A third operation 330 performed at the security console 112 may correspond to a selection, by the user 114, of a particular remote scan engine (identified as "Remote scan engine (i)" in FIG. 3) to be utilized for a particular scan as part of the user input 316. In the particular embodiment depicted in FIG. 3, the user input 316 may correspond to a selection, by the user 114, of the first engine 140 at the first remote location 122 to be utilized to perform scan operation(s).

While not shown in the example of FIG. 3, it will be appreciated that in alternative embodiments, the third operation 330 performed at the security console 112 may correspond to a selection, by the user 114, of a different remote scan engine to be utilized for a particular scan (e.g., a selection of the second remote engine 150 associated with the second remote location 124, as depicted in FIG. 1, among other alternatives).

A fourth operation 340 performed at the security console 112 may correspond to a selection, by the user 114, of an "initiate scan" command as part of the user input 316. FIG. 3 illustrates that, upon receiving the "initiate scan" command, the security console 112 may transfer the custom check file(s) associated with the first custom vulnerability check 160 to the first engine 140 at the first remote location 122. As previously noted and depicted in FIG. 3, the custom check file(s) associated with the first custom vulnerability check 160 include at least the first vulnerability descriptor file 162 and the first vulnerability check file 164.

While not shown in the example of FIG. 3, it will be appreciated that in alternative embodiments, upon receiving the "initiate scan" command at operation 340, the security console 112 may transfer custom check file(s) associated with an alternative user-selected custom vulnerability check (received as part of the user input 316 at operation 320) to an alternative user-selected remote scan engine (received as part of the user input 316 at operation 330). For example, upon receiving an alternative "initiate scan" command at operation 340, the security console 112 may transfer custom check file(s) associated with the second custom vulnerability check 170 to the second engine 150 at the second remote location 124. As previously noted and depicted in FIG. 1, the custom check file(s) associated with the second custom vulnerability check 170 include at least the second vulnerability descriptor file 172 and the second vulnerability check file 174.

Upon initiation of the scan at operation 340, FIG. 3 illustrates that the first engine 140 at the first remote location 122 may perform a fifth operation 350, which may include loading the custom check file(s) associated with the first custom vulnerability check 160 (including at least the first vulnerability descriptor file 162 and the first vulnerability check file 164). While not shown in FIG. 3 (see e.g., FIG. 1 and FIGS. 2A and 2B), the first engine 140 may load the custom check file(s) into a local filesystem (at the first remote location 122) that includes at least the vulnerability manager 144 and the vulnerability check manager 146 components, which may be utilized to perform the scan(s) 180 of at least one of the asset(s) 142 at the first remote location 122.

While not shown in the example of FIG. 3, it will be appreciated that in alternative embodiments, in cases where the user 114 selected an alternative custom vulnerability check (received as part of the user input 316 at operation 320) and an alternative remote scan engine (received as part of the user input 316 at operation 330), the alternative user-selected remote scan engine at an alternative remote location may perform the fifth operation 350. As an example, in alternative embodiments, the second engine 150 at the second remote location 124 may perform the fifth operation 350, which may include loading the custom check file(s) associated with the second custom vulnerability check 170 (including at least the second vulnerability descriptor file 172 and the second vulnerability check file 174). To illustrate, referring to FIG. 1, the second engine 150 may load the custom check file(s) into a local filesystem (at the second remote location 124) that includes at least the vulnerability manager 154 and the vulnerability check manager 156 components, which may be utilized to perform the scan(s) 190 of at least one of the asset(s) 152 at the second remote location 124.

FIG. 3 illustrates that the first engine 140 at the first remote location 122 may run one or more scans using the custom vulnerability check information, at operation 360. For example, while not shown in FIG. 3 (see e.g., FIG. 1 and FIGS. 2A and 2B), the first engine 140 may utilize the vulnerability manager 144 and the vulnerability check manager 146 components to perform the scan(s) 180 of at least one of the asset(s) 142 at the first remote location 122 (based on the custom vulnerability check information associated with the first custom vulnerability check 160). FIG. 3 further illustrates that, upon completion of the scan(s) 180, the first engine 140 may send the first scan result 182 to the security console 112 via the network(s) 126, for presentation to the user 114 via a user interface.

While not shown in the example of FIG. 3, it will be appreciated that in alternative embodiments, in cases where the user 114 selected an alternative custom vulnerability check (received as part of the user input 316 at operation 320) and an alternative remote scan engine (received as part of the user input 316 at operation 330), the alternative user-selected remote scan engine at an alternative remote location may perform the sixth operation 360. As an example, in alternative embodiments, the second engine 150 at the second remote location 124 may perform the sixth operation 350, which may include performing the scan(s) 190 of at least one of the asset(s) 152 at the second remote location 124 (based on the custom vulnerability check information associated with the second custom vulnerability check 170). For example, while not shown in FIG. 3 (see e.g., FIG. 1), the second engine 150 may utilize the vulnerability manager 154 and the vulnerability check manager 156 components to perform the scan(s) 190 of at least one of the asset(s) 152 at the second remote location 124 (based on the custom vulnerability check information associated with the second custom vulnerability check 170). In such alternative cases, upon completion of the scan(s) 190, the second engine 150 may send the second scan result 192 to the security console 112 via the network(s) 126, for presentation to the user 114 via a user interface.

Thus, FIG. 3 illustrates an example process of synchronizing custom vulnerability check(s) between an on-premises security console 112 and a distributed engine (e.g., the first engine 140 at the first remote location 122). In contrast to a typical cumbersome and time-consuming process of the user 114 managing and transferring such custom vulnerability checks, FIG. 3 illustrates that the systems and methods of the present disclosure enable the user 114 to load the custom vulnerability check(s) into the local security console 112, and the local security console 112 automatically transfers the custom vulnerability check(s) to a user-selected standalone engine at a user-selected remote location. Thus, FIG. 3 illustrates that the systems and methods of the present disclosure may provide an improved customer experience, including increased efficiency and reliability by allowing a customer to avoid the cumbersome and time-consuming process of managing and transferring such custom vulnerability checks on their own.

Figure 4:
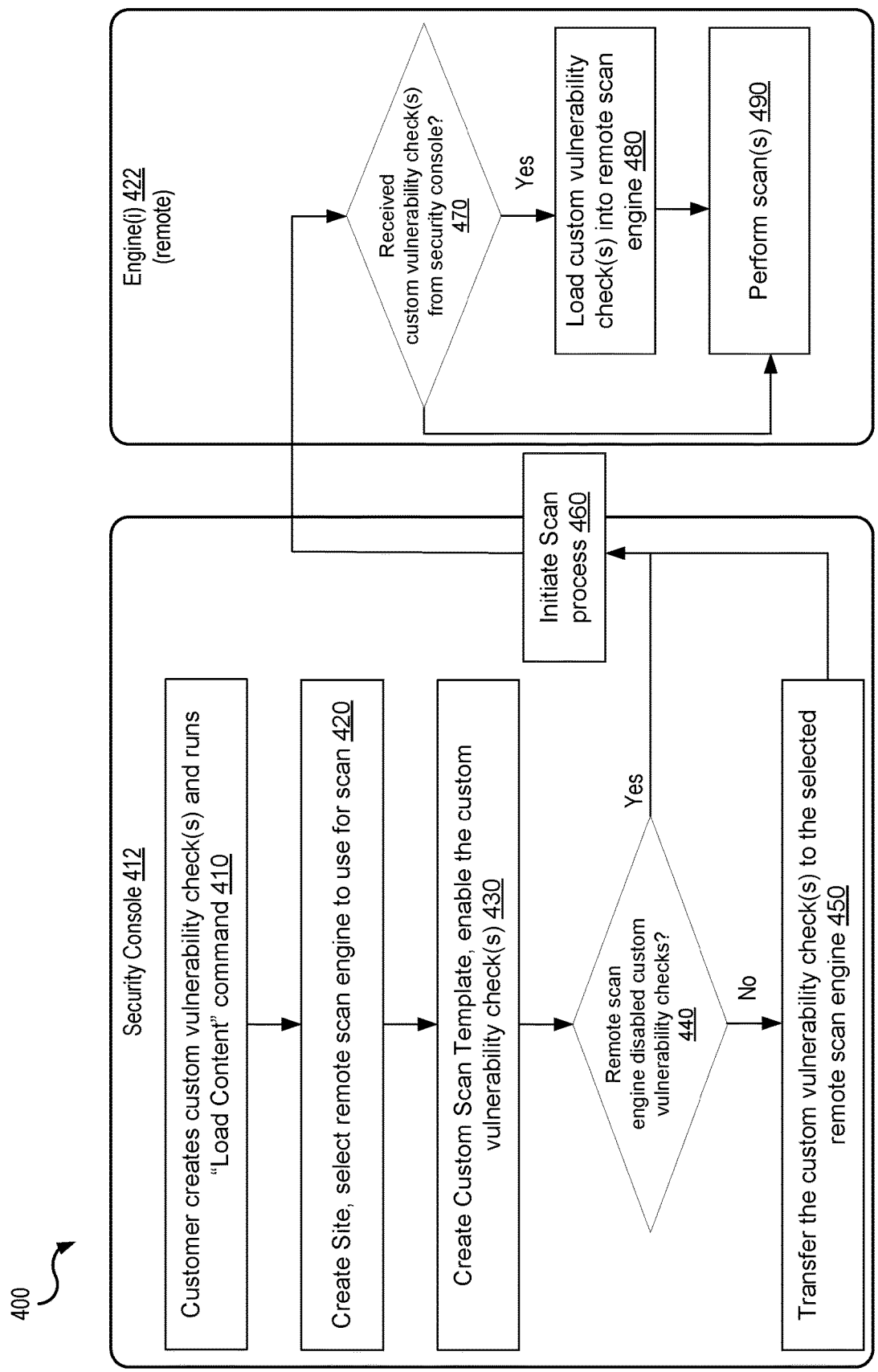
FIG. 4 is a diagram that illustrates an example process of synchronizing a custom vulnerability check between an on-premises security console and a distributed engine after verifying that custom vulnerability checks are enabled for the distributed scan engine, according to some embodiments.

FIG. 4 is a diagram 400 that illustrates an example process of synchronizing a custom vulnerability check between an on-premises security console 412 and a distributed engine 422 after verifying that custom vulnerability checks are enabled for the distributed scan engine, according to some embodiments. In some embodiments, the security console 412 depicted in FIG. 4 may correspond to the security console 112 at the customer location 120 as depicted in FIGS. 1, 2A-2B, and 3. In some embodiments, the distributed engine 422 of FIG. 4 (identified as "Engine (i)") may correspond to the first engine 140 at the first remote location 122 (see FIGS. 1, 2A-2B, and 3) or may correspond to the second engine 150 at the second remote location 124 (see FIG. 1).

FIG. 4 illustrates that, in some embodiments, prior to initiating file transfer, the local security console 412 may be configured to determine whether a particular user-selected scan engine instance has disabled custom vulnerability checks. As an illustrative example, the selected scan engine instance may correspond to a shared hosted engine instance that is utilized by multiple customers, and custom checks may be inappropriate for various security/business reasons. While the following description refers to an example in which the distributed engine 422 of FIG. 4 corresponds to the first engine 140 at the first remote location 122 (as depicted in FIG. 1, FIGS. 2A-2B, and FIG. 3), it will be appreciated that similar operations may be performed when the distributed engine 422 of FIG. 4 corresponds to the second engine 150 at the second remote location 124 (as depicted in FIG. 1).

FIG. 4 illustrates various operations that may be performed at the security console 412 or at the remote engine 422. With respect to the operations performed at the security console 412, FIG. 4 illustrates that a customer may create custom vulnerability check(s) and run a "load content" command, at operation 410. For example, as described herein with respect to FIG. 3, the user 114 may provide a "load content" command as part of the user input 316 to the security console 112 (see FIG. 3, operation 310). As previously described herein with respect to FIG. 3, responsive to receiving this "load content" command from the user 114, the security console 112 may load custom check file(s) provided by the user 114 into a local filesystem. For example, for the first custom vulnerability check 160, such custom check file(s) include at least the first vulnerability descriptor file 162 and the first vulnerability check file 164 associated with the first custom vulnerability check 160.

FIG. 4 illustrates that, at the security console 412, a customer may create a site and select a remote engine to use for a scan, at operation 420. For example, as described herein with respect to FIG. 3, the user 114 may select the first custom vulnerability check 160 and the first engine 140 at the first remote location 122 as part of the user input 316 to the security console 112 (see FIG. 3, operations 320 and 330).

FIG. 4 illustrates that, at the security console 412, a customer may create a custom scan template and enable the custom vulnerability check(s), at operation 430. For example, while not shown in the example depicted in FIG. 3, the user 114 may provide such information as part of the user input 316 prior to initiating a scan (at operation 340).

FIG. 4 illustrates that, at operation 440, the security console 412 may determine whether the selected remote scan engine has disabled custom vulnerability checks. For example, while not shown in the example depicted in FIG. 3, the security console 112 at the customer location 120 may either access information stored at a local filesystem (not shown) to determine whether the first engine 140 has disabled custom vulnerability checks, in some cases. As another example, while not shown in the example depicted in FIG. 3, the security console 112 at the customer location 120 may send a query (not shown in FIG. 3) to the first engine 140 via the network(s) 126 to determine whether a "disabled custom check property" has been set for the first engine 140, and the first engine 140 may send a response (not shown in FIG. 3) to the security console 112 via the network(s) 126 to indicate whether custom vulnerability checks have been disabled (e.g., in cases where the first engine 140 is a hosted engine shared by more than one customer).

When, at operation 440, the security console 412 receives a response from the remote engine 422 indicative of custom checks not being disabled (i.e., "No" in FIG. 4), the security console 412 may proceed to operation 450. At operation 450, the security console 412 may transfer the custom vulnerability check(s) to the selected remote scan engine prior to initiating the scan process (at operation 460). When, at operation 440, the security console 412 receives a response from the remote engine 422 indicative of custom checks being disabled (i.e., "Yes" in FIG. 4), the security console 412 may proceed to operation 460 and initiate the scan process.

For example, referring to FIG. 3, when the first engine 140 at the first remote location 122 provides a response to the security console 112 indicative of custom checks not being disabled (i.e., "No" in FIG. 4), the security console 112 may transfer custom check file(s) associated with the first custom vulnerability check 160 to the first engine 140 via the network(s) 126. For example, in some embodiments, upon receiving the "initiate scan" command (at operation 340), the security console 112 may transfer the custom check file(s) associated with the first custom vulnerability check 160 to the first engine 140 at the first remote location 122. As depicted in FIG. 3, the custom check file(s) associated with the first custom vulnerability check 160 include at least the first vulnerability descriptor file 162 and the first vulnerability check file 164.

With respect to the operations performed at the remote engine 422, FIG. 4 illustrates that the remote engine 422 may determine whether custom vulnerability check(s) have been received from the security console 412, at operation 470. When, at operation 470, the remote engine 422 determines that custom vulnerability check(s) have been received from the security console 412 (i.e., "Yes" in FIG. 4), the remote engine 422 may proceed to operation 480. At operation 480, the remote engine 422 may load the custom vulnerability check(s) and proceed to operation 490 to perform one or more scans.

To illustrate, referring to FIG. 3, upon initiation of the scan at operation 340, FIG. 3 illustrates that the first engine 140 at the first remote location 122 may perform the fifth operation 350, which may include loading the custom check file(s) associated with the first custom vulnerability check 160 (including at least the first vulnerability descriptor file 162 and the first vulnerability check file 164). While not shown in FIG. 3 (see e.g., FIG. 1 and FIGS. 2A and 2B), the first engine 140 may load the custom check file(s) into a local filesystem (at the first remote location 122) that includes at least the vulnerability manager 144 and the vulnerability check manager 146 components, which may be utilized to perform the scan(s) 180 of at least one of the asset(s) 142 at the first remote location 122.

When, at operation 470, the remote engine 422 determines that custom vulnerability check(s) have not been received from the security console 412 (i.e., "No" in FIG. 4), the remote engine 422 may proceed to operation 490 and perform the scan(s). For example, while not shown in the example of FIG. 3, upon initiation of the scan at operation 340, the first engine 140 may proceed with the scan(s) 180 without the information from the first custom vulnerability check 160.

Thus, FIG. 4 illustrates that, in some cases, custom checks may be inappropriate for various security/business reasons (such as when the customer-selected scan engine instance corresponds to a shared hosted engine instance that is utilized by multiple customers). As such, in some cases, the security console 412 may prevent custom checks from being transferred to particular remote engines.

Figure 5:
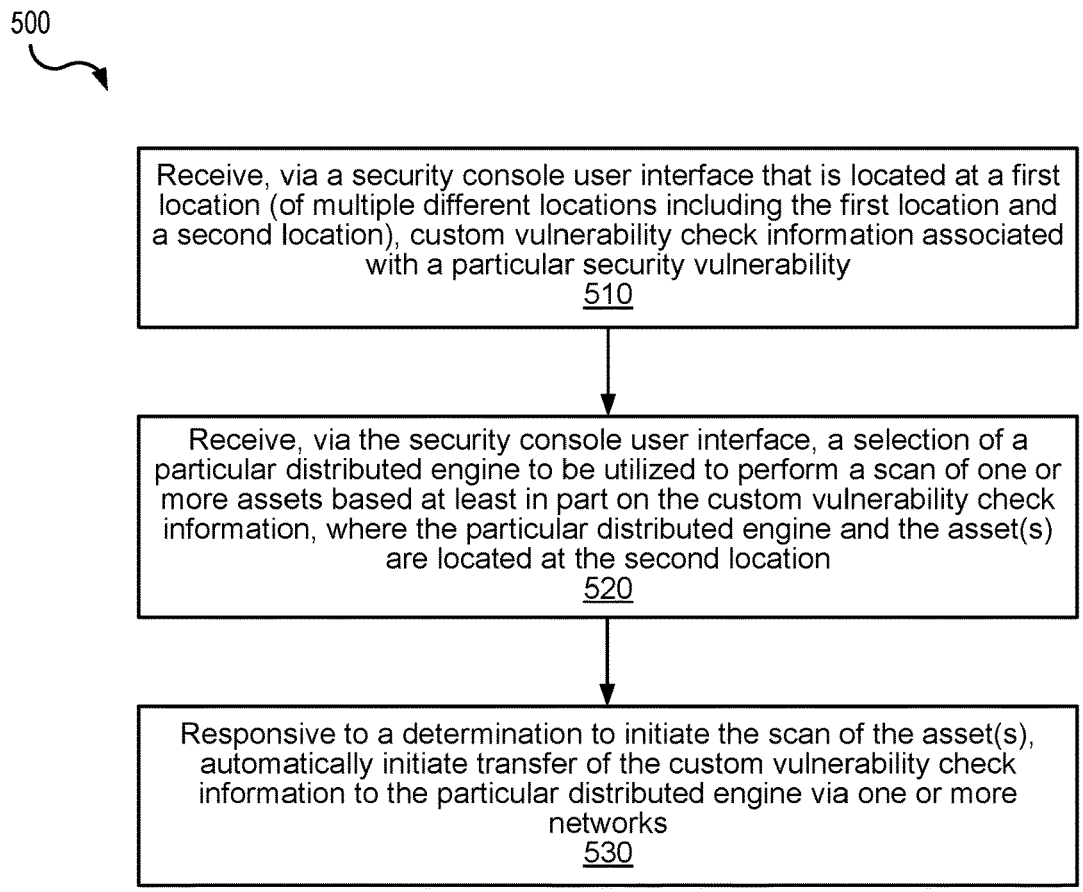
FIG. 5 is a flowchart that illustrates an example process of synchronizing vulnerability checks between distributed engines, according to some embodiments.

FIG. 5 is a flowchart 500 that illustrates an example of a process of synchronizing vulnerability checks between distributed engines, according to some embodiments. In the example depicted in FIG. 5, synchronization occurs between multiple different locations that include at least a first location and a second location. It will be appreciated that, in alternative embodiments, similar synchronization operations may be performed for alternative numbers of engines and/or locations.

At operation 510, the process includes receiving, via a security console user interface that is located at a first location (of multiple locations including the first location and a second location), custom vulnerability check information associated with a particular security vulnerability. For example, referring to FIG. 1, the user 114 may provide, as part of the user input 116, custom vulnerability check information associated with a particular security vulnerability via a user interface (not shown in FIG. 1) presented via the security console 112 at the customer location 120 of the customer's environment. As one example, the custom vulnerability check information may correspond to the first custom vulnerability check 160 (including at least the first vulnerability descriptor file 162 and the first vulnerability check file 164). As an alternative example, the custom vulnerability check information may correspond to the second custom vulnerability check 170 (including at least the second vulnerability descriptor file 172 and the second vulnerability check file 174).

At operation 520, the process includes receiving, via the security console user interface, a selection of a particular distributed engine to be utilized to perform a scan of one or more assets based at least in part on the custom vulnerability check information. The particular distributed engine and the one or more assets are located at the second location. For example, referring to FIG. 1, the user 114 may provide, as part of the user input 116, a selection of a particular distributed engine to be utilized to perform a scan of a particular set of asset(s) via a user interface (not shown in FIG. 1) presented via the security console 112 at the customer location 120. As one example, the user 114 may utilize the security console 112 to select the first engine 140 at the first remote location 122 to perform the scan(s) 180 of at least one of the first set of assets 142 based at least in part on the first custom vulnerability check 160. As an alternative example, the user 114 may utilize the security console 112 to select the second engine 150 at the second remote location 124 to perform the scan(s) 190 of at least one of the second set of assets 152 based at least in part on the second custom vulnerability check information 170.

At operation 530, the process includes, responsive to a determination to initiate the scan of the asset(s), automatically initiating transfer of the custom vulnerability check information to the particular distributed engine via one or more networks. For example, referring to FIG. 1, the user 114 may provide, as part of the user input 116, an initiate scan command (see e.g., the user input 316 including the initiate scan command 340 depicted in the example of FIG.

3), and the security console 112 may automatically initiate transfer of the custom vulnerability check information to the particular distributed engine via the one or more networks 126. As an example, responsive to a determination to initiate the scan(s) 180 of at least one of the first set of assets 142 using the first engine 140, the security console 112 may automatically initiate transfer of the first custom vulnerability check 160 (e.g., from storage at the local filesystem at the customer location 120) to the first engine 140 at the first remote location 122 via the network(s) 126 (for storage e.g., at the local filesystem at the first remote location 122). As an alternative example, responsive to a determination to initiate the scan(s) 190 of at least one of the second set of assets 152 using the second engine 150, the security console 112 may automatically initiate transfer of the second custom vulnerability check 170 (e.g., from storage at the local filesystem at the customer location 120) to the second engine 150 at the second remote location 124 via the network(s) 126 (for storage e.g., at the local filesystem at the second remote location 124).

Thus, FIG. 5 illustrates an example of a process of synchronizing vulnerability checks between distributed engines. The example process depicted in FIG. 5 may provide an improved customer experience, including increased efficiency and reliability by allowing a customer to avoid the cumbersome and time-consuming process of managing and transferring such custom vulnerability checks on their own.

FIG. 6 is a block diagram illustrating an example computer system 600 that is used to implement one or more portions of a system that implements synchronization of vulnerability checks between distributed engines, according to some embodiments. For example, in some cases, the computer system 600 may be a server that implements one or more components of the computing resource(s) 110 (at the customer location 120 of a customer's environment) of FIG. 1. As another example, in some cases, the computer system 600 may be a computing device (e.g., a server) that implements one or more components of the first engine 140 (at the first remote location 122 of the customer's environment) or the second engine 150 (at the second remote location 124 of the customer's environment) of FIG. 1.

Computer system 600 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 600 includes one or more processors 610, which may include multiple cores coupled to a system memory 620 via an input/output (I/O) interface 630. Computer system 600 further includes a network interface 640 coupled to I/O interface 630. In some embodiments, computer system 600 may be a uniprocessor system including one processor 610, or a multiprocessor system including several processors 610*a-n*, as shown. The processors 610 may be any suitable processors capable of executing instructions. For example, in various embodiments, processors 610 may implement one of a number of instruction set architectures (ISAs), such as the x86, PowerPC, SPARC, or MIPS ISA.

As shown, the computer system 600 may also include one or more network communication devices (e.g., network interface 640) for communicating with other systems and/or components over a communications network. For example, an instance of an application executing on computer system 600 may use network interface 640 to communicate with another server application executing on another computer system, as described herein.

As shown, computer system 600 may use its network interface 640 to communicate with one or more other devices 660, such as persistent storage devices and/or one or more I/O devices. In some embodiments, some of these other devices may be implemented locally on the computer system 600, accessible via the I/O interface 630. In various embodiments, persistent storage devices may include disk drives, tape drives, solid state memory, other mass storage devices, or any other persistent storage device. The computer system 600 may store instructions and/or data in persistent storage devices, and retrieve the stored instruction and/or data as needed.

As shown, the computer system 600 may include one or more system memories 620 that store instructions and data accessible by processor(s) 610. In various embodiments, system memories 620 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 620 may be used to store code 625 or executable instructions to implement the methods and techniques described herein. For example, in some cases, the executable instructions may include instructions to implement a security console 612, which may correspond to the security console 112 depicted in FIGS. 1, 2A-2B, and 3 or the security console 412 depicted in FIG. 4. To illustrate, the executable instructions may include instructions to implement the security console 612 in cases where the computer system 600 implements one or more components of the computing resource(s) 110 at the customer location 120 of a customer's environment, as depicted in FIG. 1.

As another example, the executable instructions may include instructions to implement a particular engine 630 (identified as "Engine (i)" in FIG. 6) and its associated components such as a particular vulnerability manager 634 (identified as "Vulnerability manager (i)" in FIG. 6) and vulnerability check manager 636 (identified as "Vulnerability manager (i)" in FIG. 6), as discussed. For example, in some cases, the particular engine 630 may correspond to the engine 130, the vulnerability manager 634 may correspond to the vulnerability manager 134, and the vulnerability check manager 636 may correspond to the vulnerability check manager 136 depicted at the customer location 120 in FIG. 1.

As another example, in some cases, the particular engine 630 may correspond to the first engine 130, the vulnerability manager 634 may correspond to the vulnerability manager 144, and the vulnerability check manager 636 may correspond to the vulnerability check manager 146 depicted at the first remote location 122 in FIGS. 1, 2A-2B, and 3. As another example, in some cases, the particular engine 630 may correspond to the second engine 150, the vulnerability manager 634 may correspond to the vulnerability manager 154, and the vulnerability check manager 636 may correspond to the vulnerability check manager 156 depicted at the second remote location 124 in FIG. 1. As discussed, in some cases, the engine 422 ("Engine (i)") depicted in FIG. 4 may be either the first engine 130 at the first remote location 122 or the second engine 150 at the second remote location 124 of the customer's environment (as depicted in FIG. 1).

The system memory 620 may also be used to store data 626 needed or produced by the executable instructions. For example, the in-memory data 626 may include portions of the customer-provided vulnerability check information, as discussed. FIG. 6 illustrates that the customer-provided vulnerability check information may correspond to one or more custom vulnerability checks 616, including the vulnerability descriptor and vulnerability check files associated with a particular custom vulnerability check. For example, in some cases, the custom vulnerability check(s) 616 of FIG. 6 may include the first custom vulnerability check 160, as depicted in FIGS. 1, 2A-2B, and 3. In such cases, a first vulnerability descriptor file 662 depicted in FIG. 6 may correspond to the first vulnerability descriptor file 162 (with details depicted in the first XML file 262 of FIG. 2A), and a first vulnerability check file 664 depicted in FIG. 6 may correspond to the first vulnerability check file 164 (with details depicted in the second XML file 264 of FIG. 2B). As another example, in some cases, the custom vulnerability check(s) 616 of FIG. 6 may include the second custom vulnerability check 170, as depicted in FIG. 1. In such cases, a second vulnerability descriptor file 672 depicted in FIG. 6 may correspond to the second vulnerability descriptor file 172 of FIG. 1, and a second vulnerability check file 674 depicted in FIG. 6 may correspond to the second vulnerability check file 174 of FIG. 1. FIG. 6 further illustrates, via a dashed line, that the in-memory data 626 may include information associated with additional custom vulnerability checks.

In some embodiments, some of the code 625 or executable instructions may be persistently stored on the computer system 600 and may have been loaded from external storage media. The persistent storage of the computer system 600 and the external media are examples of non-transitory computer-readable storage media, which may be used to store program instructions to be executed by the computer system 600. A non-transitory computer-readable storage medium may provide the capability to store information in a form readable by a machine (e.g., computer system 600). Non-transitory computer-readable media may include storage media such as magnetic or optical media, disk or DVD/CD-ROM devices, archival tapes, network-attached storage systems, or other computer systems.

In some embodiments, the I/O interface 630 may be configured to coordinate I/O traffic between processor 610, system memory 620 and any peripheral devices in the system, including through network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments, some or all of the functionality of I/O interface 630, such as an interface to system memory 620, may be incorporated directly into processor 610.

In some embodiments, the network interface 640 may allow data to be exchanged between computer system 600 and other devices attached to a network. The network interface 640 may also allow communication between computer system 600 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems. Multiple input/output devices may be present in computer system 600 or may be distributed on various nodes of a distributed system that includes computer system 600. In some embodiments, similar input/output devices may be separate from computer system 600 and may interact with one or more nodes of a distributed system that includes computer system 600 through a wired or wireless connection, such as over network interface 640. Network interface 640 may commonly support one or more wireless networking protocols (e.g., Wi-Fi/IEEE 802.11, or another wireless networking standard). In some embodiments, the network interface 640 may support communication via telecommunications/telephony networks such as analog voice networks or digital fiber communications networks, via storage area networks such as Fibre Channel SANs, or via any other suitable type of network and/or protocol.

Various modifications and changes may be made as would be obvious to a person skilled in the art having the benefit of this disclosure. The various embodiments described herein are meant to be illustrative and not limiting. Many variations, modifications, additions, and improvements are possible. These and other variations, modifications, additions, and improvements may fall within the scope of embodiments as defined in the claims that follow.

What is claimed is:

1. A system, comprising:
one or more hardware processors with associated memory that implement vulnerability check synchronization between computing resources at multiple different locations including a first location and a second location, wherein the one or more hardware processors are configured to:
receive, via a security console user interface that is located at the first location, custom vulnerability check information associated with a particular security vulnerability;
receive, via the security console user interface, a selection of a particular distributed engine to be utilized to perform a scan of one or more assets based at least in part on the custom vulnerability check information, wherein the particular distributed engine and the one or more assets are located at the second location;
responsive to a determination to initiate the scan of the one or more assets, automatically initiate transfer of the custom vulnerability check information to the particular distributed engine via one or more networks;
receive, via the security console user interface, a selection of an additional particular distributed engine to be utilized to perform a scan of one or more additional assets based at least in part on the custom vulnerability check information;
responsive to a determination to initiate the scan of the one or more additional assets, determine whether scanning using custom vulnerability check information is enabled with respect to the additional particular distributed engine, wherein:
responsive to a determination that scanning using custom vulnerability check information is enabled with respect to the additional particular distributed engine, automatically initiate transfer of the additional custom vulnerability check information to the additional particular distributed engine; and responsive to a determination that scanning using custom vulnerability check information is disabled:
    refrain from transferring the additional custom vulnerability check information to the additional particular distributed engine; and
    cause the additional particular distributed engine to scan the one or more additional assets using standard vulnerability check information.

2. The system of claim 1, wherein the one or more hardware processors are configured to receive, via the security console user interface, additional custom vulnerability check information associated with an additional security vulnerability.

3. The system of claim 2, wherein the one or more hardware processors are configured to automatically initiate transfer of the additional custom vulnerability check information to the particular distributed engine via the one or more networks responsive to the determination to initiate the scan of the one or more assets.

4. The system of claim 2, wherein the multiple different locations include an additional location, and wherein the one or more hardware processors are configured to:
    receive, via the security console user interface, an additional selection of an additional distributed engine to be utilized to perform a scan of one or more additional assets based at least in part on the additional custom vulnerability check information, wherein the additional distributed engine and the one or more additional assets are located at the additional location; and
    responsive to a determination to initiate the scan of the one or more additional assets, automatically initiate transfer of the custom vulnerability check information to the additional distributed engine at the additional location via the one or more networks.

5. The system of claim 1, wherein the one or more hardware processors are configured to:
    store the custom vulnerability check information associated with the particular security vulnerability at a first storage system that is located at the first location; and
    responsive to the determination to initiate the scan of the one or more assets, retrieve the custom vulnerability check information from the first storage system prior to automatically initiating the transfer to a second storage system that is located at the second location.

6. The system of claim 1, wherein the custom vulnerability check information includes one or more custom check files associated with the particular security vulnerability, and wherein the one or more custom check files include at least a vulnerability descriptor file and a vulnerability check file.

7. The system of claim 6, wherein the vulnerability descriptor file contains information about the particular security vulnerability, and wherein the vulnerability check file contains one or more tests that are utilized to verify existence of the particular security vulnerability.

8. The system of claim 6, wherein the one or more custom check files include one or more additional vulnerability check files.

9. The system of claim 6, wherein the vulnerability descriptor file and the vulnerability check file each have an extensible markup language (XML) file format.

10. The system of claim 9, wherein the vulnerability descriptor file corresponds to a first type of XML file having a first set of attributes and a first set of elements, and wherein the vulnerability check file corresponds to a second type of XML file having a second set of attributes and a second set of elements.

11. The system of claim 1, wherein the standard vulnerability check information includes information about the particular security vulnerability obtained from a vulnerability database published by a security standards organization.

12. A method comprising:
    implementing, using one or more hardware processors, vulnerability check synchronization between computing resources at multiple different locations including a first location and a second location, wherein the implementing comprises:
        receiving, via a security console user interface that is located at the first location, custom vulnerability check information associated with a particular security vulnerability;
        receiving, via the security console user interface, a selection of a particular distributed engine to be utilized to perform a scan of one or more assets based at least in part on the custom vulnerability check information, wherein the particular distributed engine and the one or more assets are located at the second location;
        responsive to a determination to initiate the scan of the one or more assets, automatically initiate transfer of the custom vulnerability check information to the particular distributed engine via one or more networks;
        receiving, via the security console user interface, a selection of an additional particular distributed engine to be utilized to perform a scan of one or more additional assets based at least in part on the custom vulnerability check information;
        responsive to a determination to initiate the scan of the one or more additional assets, determining whether scanning using custom vulnerability check information is enabled with respect to the additional particular distributed engine, wherein:
            responsive to a determination that scanning using custom vulnerability check information is enabled with respect to the additional particular distributed engine, automatically initiating transfer of the additional custom vulnerability check information to the additional particular distributed engine; and
            responsive to a determination that scanning using custom vulnerability check information is disabled:
                refraining from transferring the additional custom vulnerability check information to the additional particular distributed engine; and
                causing the additional particular distributed engine to scan the one or more additional assets using standard vulnerability check information.

13. The method of claim 12, further comprising:
    storing the custom vulnerability check information associated with the particular security vulnerability at a first storage system that is located at the first location; and
    responsive to the determination to initiate the scan of the one or more assets, retrieving the custom vulnerability check information from the first storage system prior to automatically initiating the transfer to a second storage system that is located at the second location.

14. The method of claim 12, wherein the custom vulnerability check information includes one or more custom check files associated with the particular security vulnerability, and wherein the one or more custom check files include at least a vulnerability descriptor file and a single vulnerability check file.

15. The method of claim 12, wherein the custom vulnerability check information includes one or more custom check files associated with the particular security vulnerability, and wherein the one or more custom check files include at least a vulnerability descriptor file and multiple vulnerability check files.

16. One or more non-transitory computer-accessible storage media storing program instructions that, when executed on or across one or more processors, implement at least a portion of a system that implements vulnerability check synchronization between computing resources at multiple different locations including a first location and a second location and cause the system to:
receive, via a security console user interface that is located at the first location, custom vulnerability check information associated with a particular security vulnerability;
receive, via the security console user interface, a selection of a particular distributed engine to be utilized to perform a scan of one or more assets based at least in part on the custom vulnerability check information, wherein the particular distributed engine and the one or more assets are located at the second location;
responsive to a determination to initiate the scan of the one or more assets, automatically initiate transfer of the custom vulnerability check information to the particular distributed engine via one or more networks;
receive, via the security console user interface, a selection of an additional particular distributed engine to be utilized to perform a scan of one or more additional assets based at least in part on the custom vulnerability check information;
responsive to a determination to initiate the scan of the one or more additional assets, determine whether scanning using custom vulnerability check information is enabled with respect to the additional particular distributed engine, wherein:
responsive to a determination that scanning using custom vulnerability check information is enabled with respect to the additional particular distributed engine, automatically initiate transfer of the additional custom vulnerability check information to the additional particular distributed engine; and
responsive to a determination that scanning using custom vulnerability check information is disabled:
refrain from transferring the additional custom vulnerability check information to the additional particular distributed engine; and
cause the additional particular distributed engine to scan the one or more additional assets using standard vulnerability check information.

17. The one or more non-transitory computer-accessible storage media of claim 16, wherein the program instructions when executed on or across the one or more processors cause the system to:
store the custom vulnerability check information associated with the particular security vulnerability at a first storage system that is located at the first location; and
responsive to the determination to initiate the scan of the one or more assets, retrieve the custom vulnerability check information from the first storage system prior to automatically initiating the transfer to a second storage system that is located at the second location.

18. The one or more non-transitory computer-accessible storage media of claim 16, wherein the custom vulnerability check information includes one or more custom check files associated with the particular security vulnerability, and wherein the one or more custom check files include at least a vulnerability descriptor file and a vulnerability check file.

19. The one or more non-transitory computer-accessible storage media of claim 18, wherein the vulnerability descriptor file and the vulnerability check file each have an extensible markup language (XML) file format.

20. The one or more non-transitory computer-accessible storage media of claim 19, wherein the vulnerability descriptor file corresponds to a first type of XML file having a first set of attributes and a first set of elements, and wherein the vulnerability check file corresponds to a second type of XML file having a second set of attributes and a second set of elements.

\* \* \* \* \*